US010631195B2

(12) United States Patent
Benammar et al.

(10) Patent No.: US 10,631,195 B2
(45) Date of Patent: Apr. 21, 2020

(54) BUFFER STATUS REPORT TRIGGER ENHANCEMENT IN A LONG TERM EVOLUTION AND SATELLITE COMMUNICATION SYSTEM

(71) Applicants: Nassir Benammar, Rockville, MD (US); Channasandra Ravishankar, Clarksburg, MD (US)

(72) Inventors: Nassir Benammar, Rockville, MD (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 34 days.

(21) Appl. No.: 15/722,776

(22) Filed: Oct. 2, 2017

(65) Prior Publication Data
US 2018/0368022 A1 Dec. 20, 2018

Related U.S. Application Data

(60) Provisional application No. 62/521,348, filed on Jun. 16, 2017.

(51) Int. Cl.
H04W 28/02 (2009.01)
H04W 72/12 (2009.01)
(Continued)

(52) U.S. Cl.
CPC .... H04W 28/0278 (2013.01); H04B 7/18584 (2013.01); H04W 28/12 (2013.01);
(Continued)

(58) Field of Classification Search
CPC ...... H04L 49/90; H04W 28/12; H04W 24/08; H04W 72/1215; H04W 72/1242; H04W 72/0413; H04W 72/14
(Continued)

(56) References Cited

U.S. PATENT DOCUMENTS

2009/0168731 A1* 7/2009 Zhang ................... H04L 1/1854
370/336
2012/0069805 A1* 3/2012 Feuersanger ..... H04W 72/1284
370/329
(Continued)

FOREIGN PATENT DOCUMENTS

EP 2197235 B1 1/2013
WO 2007075784 A2 7/2007
WO 2008100242 A2 8/2008

OTHER PUBLICATIONS

3GPP 36.321 Evolved Universal Terrestrial Radio Access (E-UTRA); Medium Access Control (MAC); Protocol specification (Release 10), 2010.
(Continued)

Primary Examiner — Phong La
(74) Attorney, Agent, or Firm — Capitol City TechLaw; Jasbir Singh

(57) ABSTRACT

A method for reporting backlog in a LTE-like environment is disclosed. The method includes: providing a pending allocation for transferring a pending request data; receiving a new request for transferring data prior to completion of transferring the pending request data; generating a backlog report for the new request; sending the backlog report within the pending allocation; and receiving a new allocation for the new request data.

20 Claims, 4 Drawing Sheets

(51) Int. Cl.
  *H04B 7/185* (2006.01)
  *H04W 28/12* (2009.01)
  *H04L 12/861* (2013.01)
  *H04W 24/08* (2009.01)
  *H04W 72/04* (2009.01)
  *H04W 72/14* (2009.01)

(52) U.S. Cl.
  CPC ... *H04W 72/1215* (2013.01); *H04W 72/1242* (2013.01); *H04W 72/1284* (2013.01); *H04L 49/90* (2013.01); *H04W 24/08* (2013.01); *H04W 72/0413* (2013.01); *H04W 72/1252* (2013.01); *H04W 72/14* (2013.01)

(58) Field of Classification Search
  USPC .......................................................... 370/336
  See application file for complete search history.

(56) References Cited

U.S. PATENT DOCUMENTS

| | | | | |
|---|---|---|---|---|
| 2012/0300744 | A1* | 11/2012 | Larmo | H04W 72/1284 370/329 |
| 2013/0136004 | A1 | 5/2013 | Torres et al. | |
| 2014/0293896 | A1* | 10/2014 | Kuo | H04W 72/0413 370/329 |
| 2015/0016350 | A1* | 1/2015 | Moulsley | H04W 72/0453 370/329 |
| 2015/0223232 | A1* | 8/2015 | Eriksson | H04W 28/065 370/329 |
| 2016/0073428 | A1* | 3/2016 | Vutukuri | H04W 72/1215 370/329 |
| 2016/0205703 | A1* | 7/2016 | Dudda | H04W 76/38 455/452.1 |
| 2016/0381595 | A1* | 12/2016 | Lee | H04W 28/0278 370/329 |
| 2017/0238314 | A1* | 8/2017 | Zhang | H04W 72/042 370/336 |
| 2018/0020445 | A1* | 1/2018 | Harada | H04J 1/00 |
| 2018/0049234 | A1* | 2/2018 | Lee | H04L 1/18 |
| 2018/0139653 | A1* | 5/2018 | Lee | H04W 28/0278 |
| 2018/0255569 | A1* | 9/2018 | Aiba | H04W 56/00 |
| 2018/0262945 | A1* | 9/2018 | Yi | H04W 28/10 |
| 2018/0270699 | A1* | 9/2018 | Babaei | H04W 28/0278 |

OTHER PUBLICATIONS

3GPP 36.331 Evolved Universal Terrestrial Radio Access (E-UTRA); Radio Resource Control (RRC); Protocol specification (Release 10), 2010.

International search report for corresponding PCT Application No. PCT/US2018/037765.

* cited by examiner

BUFFER STATUS REPORT TRIGGER ENHANCEMENT IN A LONG TERM EVOLUTION AND SATELLITE COMMUNICATION SYSTEM

CROSS-REFERENCE TO RELATED APPLICATIONS

The present application claims the benefit of U.S. Provisional Application No. 62/521,348 filed Jun. 16, 2017, which is incorporated herein by reference.

FIELD

The present teachings disclose a method and device to improve triggers that communicate/transmit a Buffer Status Report (BSR) with backlog information. In particular, the present teachings disclose a trigger that expedites a BSR to improve uplink and downlink allocation by a bandwidth allocator such as an eNodeB or a satellite gateway.

The new trigger may update an eNodeB (enhanced node B) or a satellite gateway (for example an LEO, MEO or GEO satellite communication system that borrows BSR reporting from the initial's Long-Term Evolution (LTE) standard specification or the like), with backlog information at the User Terminal (UT).

BACKGROUND

The present teachings improve on Buffer Status Report (BSR) reporting and triggers in Long Term Evolution (LTE) or satellite communication systems that borrow from the LTE specification and Medium Access Control (MAC) Specification with respect to backlog reporting. In the prior art, LTE and satellite communication systems that use BSR reporting do not get an updated backlog information adequately based on new packet arrival at a User Terminal (UT) without excessive overhead. The present teachings disclose improved reporting without excessive overhead and are compatible (robust) with an eNodeB configuration of other timer control LTE baseline BSR reporting.

A description of the prior art's LTE backlog and BSR reporting is provided in section 5.4.5 of 3GPP 36.321 Evolved Universal Terrestrial Radio Access (E-UTRA); Medium Access Control (MAC); Protocol specification (Release 10) (hereinafter "[1]") included herein in its entirety by reference. In the prior art, there are three different ways the BSR is triggered. The different triggers are as follows:

Regular BSR occurs when data arrives at an empty buffer;

retxBSR-Timer expires and there is data pending at the UT, configurable with a minimum of 320 ms per "3GPP 36.331 Evolved Universal Terrestrial Radio Access (E-UTRA); Radio Resource Control (RRC); Protocol specification (Release 10)".

periodicBSR-Timer is called a referred to a "Periodic BSR"

Also per section 5.4.4 of [1], only a Regular BSR can trigger a Scheduling Request (SR) if configured for a particular logical channel. In other words, an SR is sent only when data arrives at an empty buffer or a retxBSR-Timer expires while no uplink allocation is given for the particular logical channel. An exemplary BSR is described in section 6.1.3.1 of [1].

In general, satellite communication systems have longer link delays than what is experienced in LTE. The shortcoming of the above triggers, especially if the BSR is used in a satellite communication systems, is that an eNodeB or satellite gateway is not aware of the new packet arrival to a non-empty buffer unless a periodicBSR-Timer happens to expire at that time.

FIG. 1 illustrates exemplary BSR triggers for a prior art system.

A prior art BSR trigger system 100 includes a User Terminal (UT) 102 and a bandwidth allocator 104. The bandwidth allocator may be included in a satellite gateway or eNodeB. The UT 102 may be in an empty buffer state 110. At state 112, the UT 102 reports a buffer status or demand of N1 bytes, for example, 2000 bytes, at time t0. Per FIG. 1, at time t0+20 ms (state 114), the UT 102 gets a buffer status or demand of N2 bytes, for example, 4000 bytes to be transmitted from an upper layer. In the prior art, the new packet arrival of N2 bytes does not trigger a transmission of a new BSR as the new packet of N2 bytes did not arrive at an empty queue.

At time t0+40 ms (state 116), the UT 102 gets an uplink allocation of four (4) packets of 500 bytes each to satisfy the N1 (2000 bytes) request of the buffer from the bandwidth allocator 104. After granting the uplink allocation, the bandwidth allocator 104 (for example, eNodeB or gateway) assumes that it has fully satisfied a backlog of the UT 102 or the backlog associated with a logical channel group (LCG) (per LTE terminology). This first operation satisfies N1.

The assumption by the bandwidth allocator 104 is incorrect, as the UT one or two now has 4000 bytes of backlog (per state 114) sitting in the queue, which backlog did not trigger an SR or send a BSR to request additional uplink allocation. The lowest allowed duration for the retxBSR-Timer in the UT 102 is 320 ms per LTE. Furthermore, the UT 102 can only request an SR when the retxBSR-Timer expires at time t0+320 ms (state 118). After the SR (state 120), the UT 102 will get an uplink allocation (state 122) in which it will inform the bandwidth allocator 104 of the backlog if the backlog of the UT 102 has not been fully satisfied. Based on the BSR, the bandwidth allocator 104 would allocate the appropriate uplink resources (state 124). As such, in the best case, the appropriate uplink allocation to satisfy N2 is only granted after 320 ms (retxBSR-Timer)–20 ms (arrival of N2)+2*Round Trip Time has elapsed from the time the data (N2) arrived at the UT 102. This second operation gets an uplink allocation for N2.

Per the third trigger noted above, the UT 102 would have sent BSR if periodicBSR-Timer was configured to be less than 40 ms. The reporting is based on the configuration of a periodicBSR-Timer by the bandwidth allocator 104. Setting the timer to a low value results in too frequent reporting and associated overhead. Furthermore, the updating of the bandwidth allocator 104 by the UT 102 and a scheduler for a demand for 4000 bytes is dependent on a timing of the arrival of packets from an upper network layer (not shown) and the expiry of the periodicBSR-Timer.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In the prior art, Long-Term Evolution (LTE) and satellite communication systems that use Buffer Status Report (BSR) reporting do not get an updated backlog information adequately based on new packet arrival at a User Terminal (UT) without excessive overhead. The present teachings disclose a method and device for backlog reporting, without excessive overhead, which is compatible (robust) with timer control LTE baseline BSR reporting. The new trigger updates a bandwidth allocator, for example, the eNodeB or a satellite gateway (in the case of LEO, MEO or GEO satellite communication systems that borrow a BSR reporting mechanism from the LTE specification or the like) with backlog information at the UT.

A method for reporting backlog in a LTE-like environment is disclosed. The method includes: providing a pending allocation for transferring a pending request data; receiving a new request for transferring data prior to completion of transferring the pending request data; generating a backlog report for the new request; sending the backlog report within the pending allocation; and receiving a new allocation for the new request data.

A backlog trigger system to report backlog in a LTE-like environment is disclosed. The backlog trigger system includes a backlog reporter. The backlog reporter is configured to: to receive a pending allocation for transferring a pending request data, to receive a new request for transferring data prior to completion of transferring the pending request data, to generate a backlog report for the new request, to send the backlog report within the pending allocation, and to receive a new allocation for the new request data.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be considered to be limiting of its scope, implementations will be described and explained with additional specificity and detail through the use of the accompanying drawings.

Figure 1:
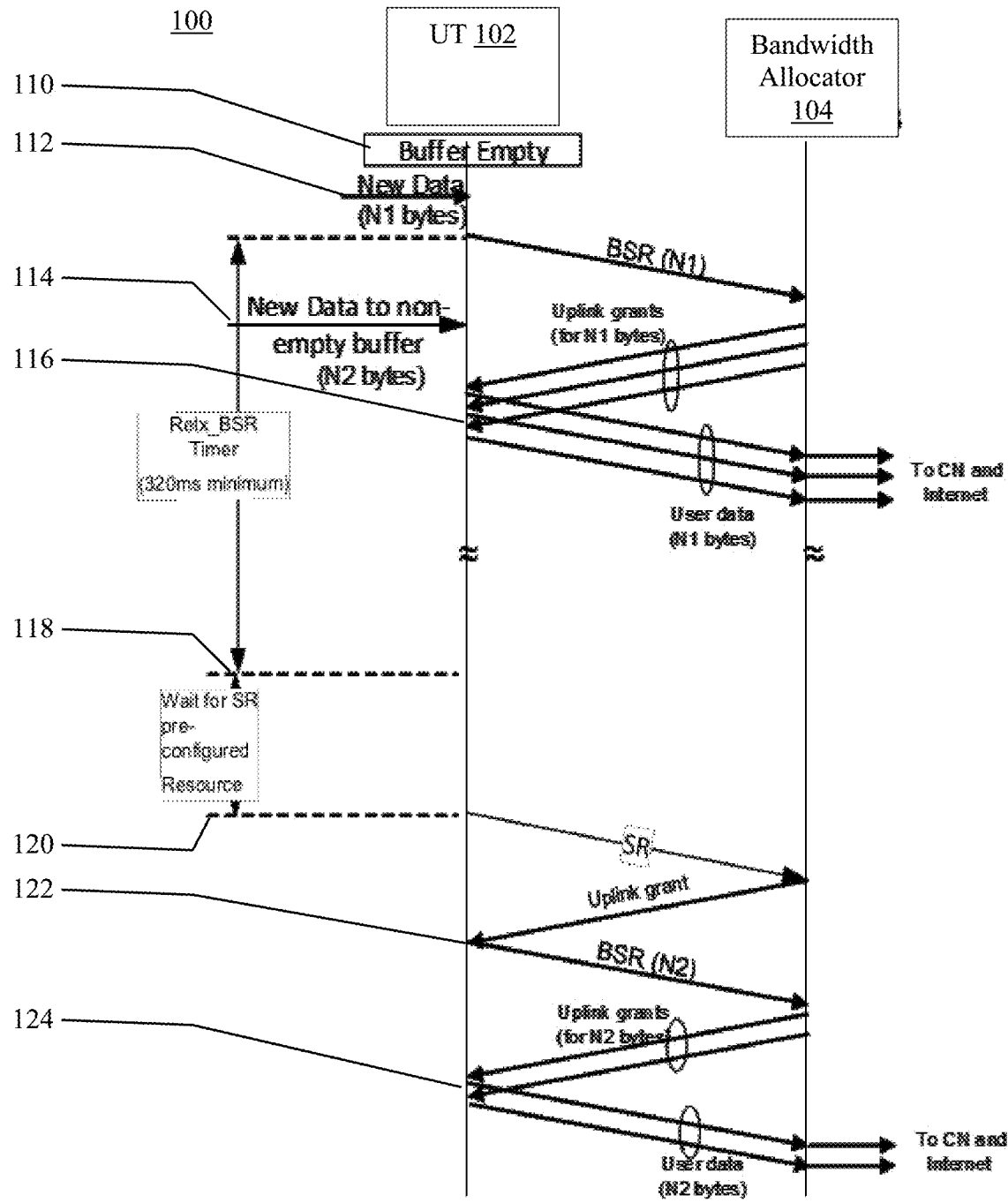
FIG. 1 illustrates exemplary BSR triggers for a prior art system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Figure 2:
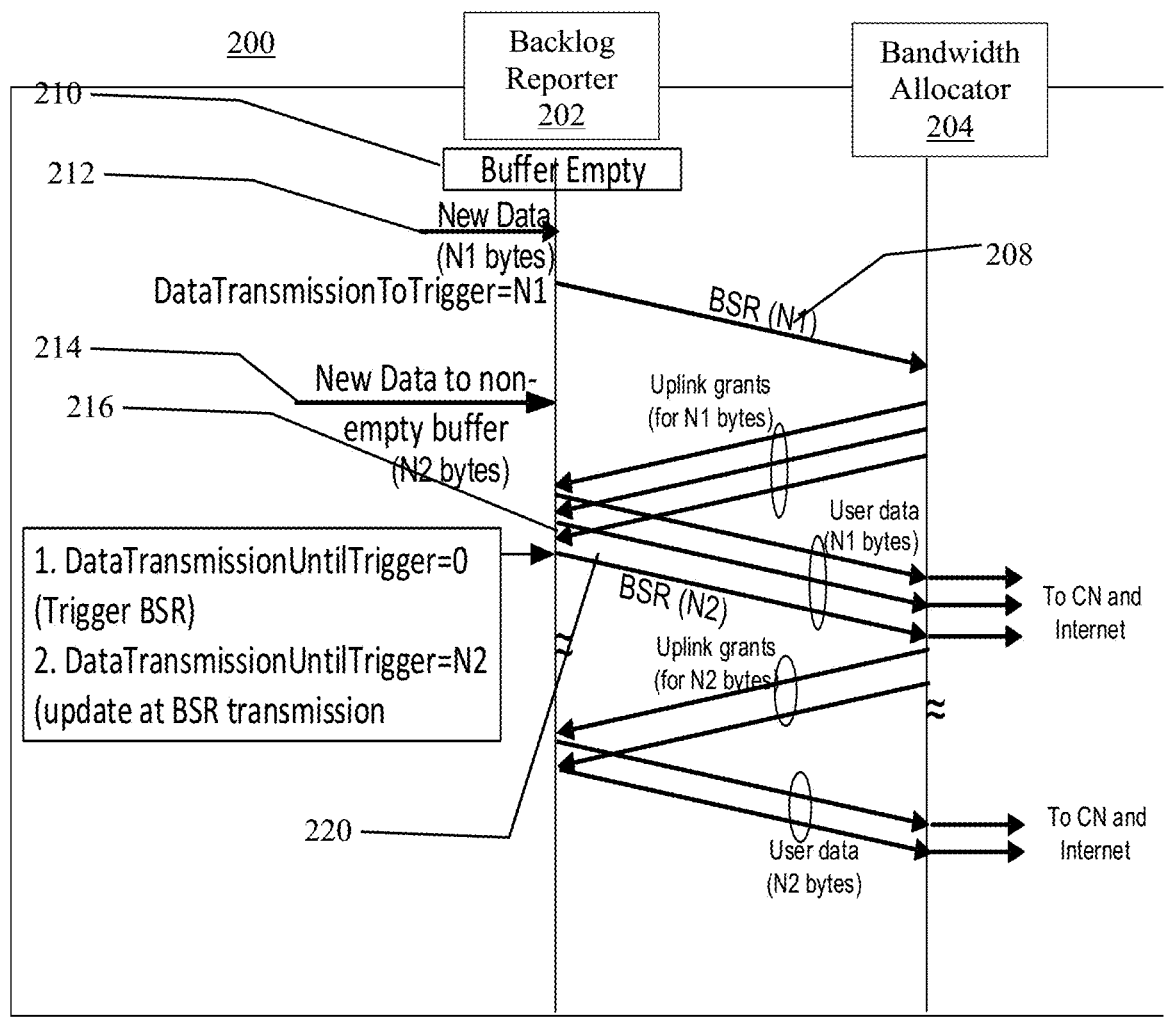
FIG. 2 illustrates an exemplary backlog trigger system according to various embodiments.

FIG. 2 illustrates an exemplary backlog trigger system according to various embodiments.

A backlog trigger system 200 includes a backlog reporter 202 and a bandwidth allocator 204. The backlog reporter 202 may be included in a User Terminal (UT). The bandwidth allocator 204 may be included in a satellite gateway or eNodeB. The backlog allocator 204 may connect to a Communications Network (CN) or Internet or the like. The backlog reporter 202 may be in an empty buffer state 210. At state 212, the backlog reporter 202 reports a buffer status or demand of N1 bytes, for example, 2000 bytes, at time t0 resulting in a BSR request 208. Per FIG. 2, at time t0+20 ms (state 214), the backlog reporter 202 gets a buffer status or demand of N2 bytes, for example, 4000 bytes to be transmitted from an upper layer. In FIG. 2, when sending a BSR request or message, the backlog reporter 202 keeps a counter, for example, a counter DataTransmissionUntilTrigger. The counter is set to the size requested in the BSR sent (BSR 208), for example, request for N1 bytes sent at state 212. At every uplink grant from the bandwidth allocator 204, the backlog reporter 202 decrements the counter according to the data sent for the uplink grant. When the counter reaches 0, a new BSR request 220 for any unsatisfied new data request received at state 214 is triggered per state 216 and the new BSR 220 for the unsatisfied new data is sent in the same allocation as the grant that satisfied all the backlog associated with the last BSR 208 sent as shown in state 216. In exemplary embodiments, a BSR (BSR 220 in the example) need not be sent if the allocation associated with N1 (state 212) satisfied all the backlog created by the new data request N2 at state 214. In exemplary embodiments, new data request N2 may be satisfied by not including a BSR for N2 in the uplink grant for the BSR 208.

In exemplary embodiments, the new BSR 220 at state 216 informs the network/system 200 of the new data arrivals since the last BSR of state 212 was sent. The backlog reporter 202 may ensure that the transmission of the BSR request/update 220 is sent prior to the bandwidth allocator 204 incorrectly deducing that all the backlog reported by the backlog reporter 202 has been serviced by the previous uplink grant (BSR 208). Therefore, in exemplary embodiments, the updated BSR 220 is sent along with the last byte that was reported in the prior BSR (BSR 108). Updating the scheduler/bandwidth allocator 204 with the latest backlog improves and expedites, for the present teachings, the uplink resource allocation without increasing overhead due to reporting.

In exemplary embodiments, the BSR 220 at state 216 adds robustness to a bandwidth allocator 204 (eNodeB, satellite gateway or the like) for which the periodicBSR-Timer is set too high, for example, in the order of 100 milliseconds.

Figure 3:
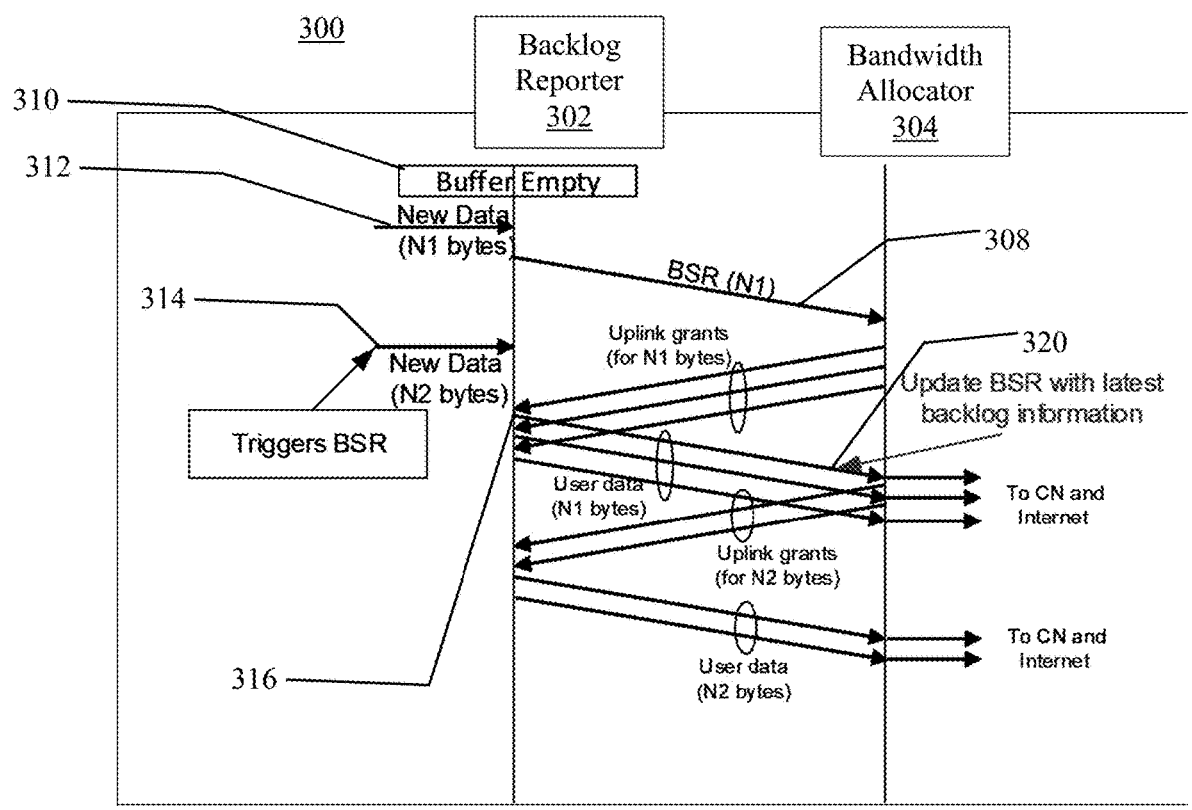
FIG. 3 illustrates an exemplary backlog trigger system according to various embodiments.

FIG. 3 illustrates an exemplary backlog trigger system according to various embodiments.

A backlog trigger system 300 includes a backlog reporter 302 and a bandwidth allocator 304. The backlog reporter 202 may be included in a User Terminal (UT). The bandwidth allocator 304 may be included in a satellite gateway or eNodeB. The backlog allocator 204 may connect to a Communications Network (CN) or Internet or the like. The backlog reporter 302 may be in an empty buffer state 310. At state 312, the backlog reporter 302 reports a buffer status or demand of N1 bytes, for example, 2000 bytes, at time t0 resulting in a BSR request 308. Per FIG. 2, at time t0+20 ms (state 314), the backlog reporter 302 gets a buffer status or demand of N2 bytes, for example, 4000 bytes to be transmitted from an upper layer. In some embodiments, a new BSR 320 is triggered (state 316) whenever there is a new data arrival. The BSR 320 contains the latest backlog information, and not the backlog information at the time of BSR request 308 or intervening triggers between BSR request 308, and utilizes the allocation associated with the BSR request 308 at state 316. In other words, if there are multiple data arrivals since the last BSR 308, there may be only one BSR transmission triggered (BSR 320) containing the backlog information for the backlog reporter 302.

The present teachings are particularly important for an air communications interface that relies on the same BSR mechanism as LTE but may have longer link delays as in a satellite communication system over geosynchronous Earth orbit (GEO), MEO or LEO satellites. In such a system, in addition to a retxBSR-timer, there is a delay associated with the Scheduling Request (SR) periodicity and its allocation. The SR resource is defined by a frame offset and a periodicity. There is also Round Trip Time (RTT) delay associated with an SR transmission after which the BSR is sent. In some embodiments, the initial grant given, due to the SR, may not satisfy all the backlog, so a BSR may be sent before the backlog from the backlog reporter. In some embodiments, additional grants are given to satisfy the allocation for the pending backlog, as discussed above.

Figure 4:
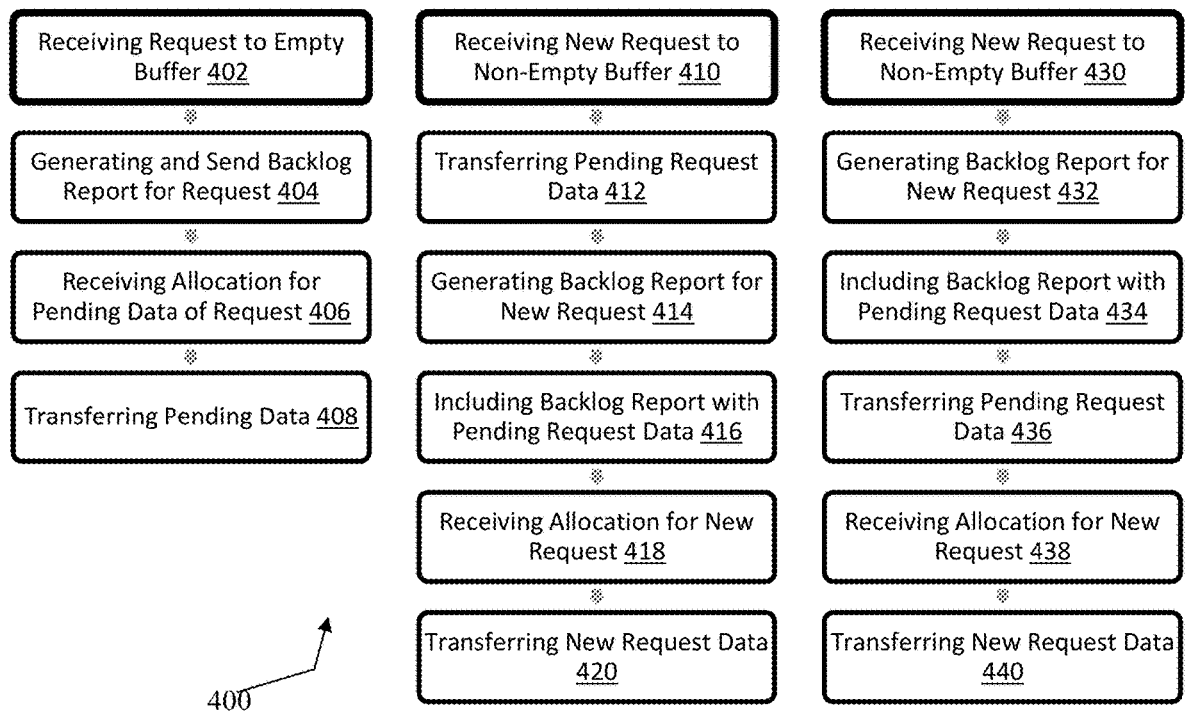
FIG. 4 illustrates a method for reporting backlog in a LTE-like environment, according to various embodiments.

FIG. 4 illustrates a method for reporting backlog in a LTE-like environment, according to various embodiments.

In exemplary embodiments, a method 400 for reporting backlog in a LTE-like environment is disclosed. The method 400 may include an operation 402 for receiving a request to transfer data to an empty buffer, thus setting the empty buffer as a non-empty buffer. The method 400 may include an operation 404 for generating and sending a backlog report for the request. The method 400 may include an operation 406 for receiving the allocation for the pending data of request 406. The method 400 may include an operation 408 for transferring the pending data of request or pending request data.

In some embodiments, the method 400 may include an operation 410 for receiving a new request to the non-empty buffer. The method 400 may include an operation 412 for transferring the pending request data. The method 400 may include an operation 414 for generating a backlog report for the new request. The method 400 may include an operation 416 for including the backlog report with a grant or allocation for the pending request data. The method 400 may include an operation 418 for receiving a new grant or allocation for the new request. The method 400 may include an operation 420 for transferring the new request data in the new grant or allocation. In some embodiments, data for the new request may be transferred without requesting a grant for the new request.

In some embodiments, the method 400 may include an operation 430 for receiving a new request to the non-empty buffer. The method 400 may include operation 432 for generating the backlog report for the new request. The method 400 may include an operation 434 for including the backlog report with the pending request data. The method 400 may include an operation 436 for transferring the pending request data. The method 400 may include an operation 438 for receiving the allocation for the new request. The method 400 may include an operation 440 for transferring the new request data.

In exemplary embodiments, the present teachings are applicable to communications between a UT and a base station in a cellular network. In exemplary embodiments, the present teachings are applicable to communications between a Very Small Aperture Terminal (VSAT) and a satellite gateway.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for reporting backlog in a LTE-like environment, the method comprising:
   receiving a first request for transferring first data;
   generating a first backlog report for the first request;
   sending the first backlog report;
   receiving a first allocation, based on the first backlog report, for transferring the first data;
   prior to completion of transferring the first data, receiving a second request for transferring second data;
   in response to receiving the second request, generating a second backlog report for the second request;
   sending the second backlog report along with the first data within the first allocation; and
   receiving a second allocation, based on the second backlog report, for the second request.

2. The method of claim 1, further comprising transferring the first data prior to transferring the second data associated with the second request.

3. The method of claim 1, wherein the first allocation is sufficient to transfer the first data and the second backlog report.

4. The method of claim 1, wherein the first allocation is insufficient to transfer the first data and the second backlog report, and the method further comprises completing a transfer of the first data in an allocation different from the first allocation.

5. The method of claim 1, wherein the receiving of the first allocation occurs after the receiving of the second request.

6. The method of claim 1, wherein the receiving of the second request occurs after the receiving of the first allocation but before a completion of a transfer of the first data.

7. The method of claim 1, wherein the second request comprises a plurality of requests and the generating comprises aggregating the plurality of requests to generate the second backlog report.

8. The method of claim 1, wherein the first allocation comprises a plurality of packets and the second backlog report is included in a next packet of the plurality of packets to be transmitted.

9. The method of claim 1, wherein the first allocation comprises a plurality of packets and the second backlog report is included in a final packet of the plurality of packets to be transmitted.

10. The method of claim 1, wherein the first and second backlog reports comprise a respective Buffer Status Report (BSR) per a Long-Term Evolution (LTE) specification.

11. The method of claim 1, further comprising providing a User Terminal (UT), a satellite communication system and a network, wherein the satellite communication system connects the UT with the network.

12. A backlog trigger system to report backlog in an LTE-like environment, the backlog trigger system comprising:
 a backlog reporter:
  to receive a first request for transferring first data,
  to generate a first backlog report for the first request,
  to send the first backlog report,
  to receive a first allocation, based on the first backlog report, for transferring the first data,
  to receive, prior to completion of transferring the first data, a second request for transferring second data,
  to generate, in response to receiving the second request, a second backlog report for the second request,
  to send the second backlog report along with the first data within the first allocation, and
  to receive a second allocation, based on the second backlog report, for the second request.

13. The backlog trigger system of claim 12, wherein the backlog reporter transfers the first data prior to transferring the second data associated with the second request.

14. The backlog trigger system of claim 12, wherein the first allocation is sufficient to transfer the first data and the second backlog report.

15. The backlog trigger system of claim 12, wherein the first allocation is insufficient to transfer the first data and the second backlog report, and the backlog reporter completes a transfer of the first data in an allocation different from the first allocation.

16. The backlog trigger system of claim 12, wherein the first allocation is received after receiving the second request.

17. The backlog trigger system of claim 12, wherein the second request is received after receiving the first allocation but before a completion of a transfer of the first data.

18. The backlog trigger system of claim 12, wherein the second request comprises a plurality of requests and the backlog reporter aggregates the plurality of requests to generate the second backlog report.

19. The backlog trigger system of claim 12, wherein the first and second backlog reports comprise a respective Buffer Status Report (BSR) per a Long-Term Evolution (LTE) specification.

20. The backlog trigger system of claim 12, further comprising:
 a network; and
 a satellite communication system to connect a User Terminal (UT) with the network.

* * * * *